Dec. 28, 1943.  T. BROCKY  2,337,587

NAVIGATION GUIDE

Filed May 5, 1942

Inventor

Tony Brocky

By Nelson J Jewett

Attorney

Patented Dec. 28, 1943

2,337,587

UNITED STATES PATENT OFFICE 2,337,587

NAVIGATION GUIDE

Tony Brocky, Minneapolis, Minn., assignor of one-half to Mark Cook and George Cook, Minneapolis, Minn., as joint tenants Application May 5, 1942, Serial No. 441,881

7 Claims. (Cl. 33—61)

The invention relates to navigation instruments and has as an object the provision of an instrument to enable a navigator to ascertain very closely his position anywhere on the face of the earth at any time when the stars are visible.

It is an object of the invention to provide an instrument embodying a clock mechanism keeping zero longitude time with a star map adjustable with respect to the clock and with means for projecting an image of stars upon the star map.

It is a further object of the invention to provide an instrument which while applicable to determining both latitude and longitude at any point on the earth's surface, or on ships at sea, is especially valuable for determining locations while navigating the stratosphere.

Further objects of the invention will appear from the following description when read in connection with the accompanying drawing showing an illustrative embodiment of the invention, and wherein.

Figure 1:
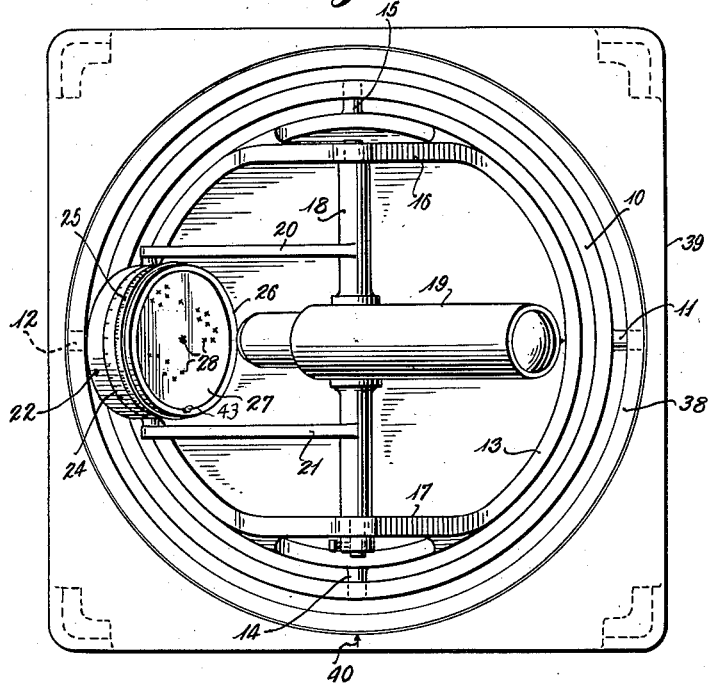
Figure 1 is a plan view.
Figure 4:
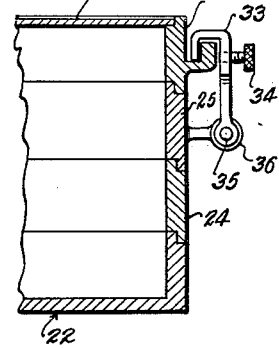
Fig. 4 is a detail section through a portion of the clock casing.
Figure 5:
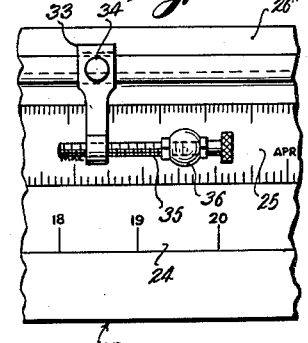
Fig. 5 is a detail side elevation of the structure shown in Figure 4.
Figure 2:
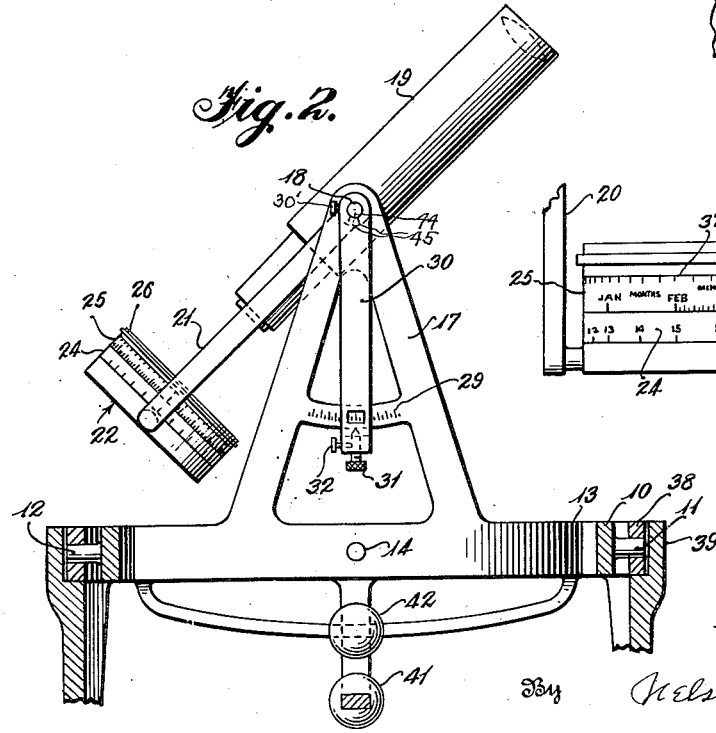
Fig. 2 is a side elevation partly in section.
Figure 3:
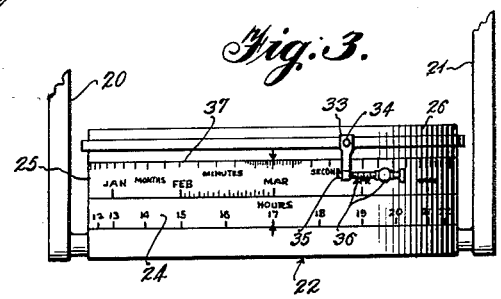
Fig. 3 is a detail side elevation of the clock casing.

As shown the device comprises a support desirably mounted upon gimbal bearings comprising a ring 10 mounted about the axis of pins 11, 12, to tilt in one plane and a ring 13 mounted in ring 10 to tilt on the axis of pins 14, 15, the axis of the latter pins being at right angles to that of the first named, in the well-known manner.

If desired the ring 10 may be the outer ring supporting a compass, magnetic or gyroscopic.

Carried by the ring 13 there is shown a pair of standards 16, 17, in which is mounted a shaft 18 upon which a projection instrument 19 is carried. Projecting from the shaft 18 there is shown a pair of arms 20, 21 rigidly supporting the casing 22 for the clock mechanism.

The "works" of the clock mechanism constitute no part of the present invention and are therefore not shown. The works should be of the type which mark the hours and also the months, as for instance such as shown in Patent No. 1,153,492, Hoitinga, September 14, 1915, with obvious arrangement of gearing to drive rings 24 and 25. The portion 23 of the casing 22 to which the arms 20, 21 are secured is stationary and rigid with the shaft 18 and the projection apparatus 19.

The ring 24 will be revolved by the clock mechanism once each twenty-four hours and the ring 25 will be revolved once a year, over ring 24.

Freely revoluble upon the ring 25 there is shown a ring 26 which carries a face 27 upon which a star map is delineated with the polar star at the center of the map, which center is rigidly fixed upon the axis of the projection instrument 19. The optical characteristics of this projection apparatus are such as to include an angle of projection such as to include the brightest stars around the polar star when directed to the north polar region.

It is to be understood that for use in the southern hemisphere a star map delineating the brightest stars adjacent the southern polar axis of the heavens will be substituted for the face 27.

Desirably the points representing the stars, as indicated at 28, Figure 1, may be perforations in the face 27 and illuminating means may be provided within the casing to permit the star representations upon the map to glow with about the same brilliance as will the star images projected by the instrument 19.

Since the center of the star map representing Polaris in the northern hemisphere is rigidly fixed with respect to the projection instrument, it is immaterial whether this star which is relatively faint can be discerned or not, and the same is true whether any star in the southern hemisphere appears at the center of the map for the reason that the bringing into registry of the brighter stars or even one bright star at each side of the polar zenith is all that is necessary to adjust the instrument.

It will be seen that if the instrument is located at zero degrees longitude, as for instance at Greenwich, England, and the telescope is pointed at the North Star and the ring 26 carrying the star map is revolved to bring the constellations about Polaris, as for instance Ursa Major and Andromeda, into registry with their indicated locations upon the star map and if the instrument then be allowed to stand, the clock being accurately indicating time, the registration between the map and the projection of the stars will remain indefinitely. In this condition the angle of the instrument carried by the shaft 18 when read upon the scale 29 will read the latitude of Greenwich. The arm 30 which is adjustable upon the shaft 18 and retained in adjustable position as by screw 30' has a set screw 31 and a micrometer adjustment 32 in the manner common with theodolites.

To enable a fine adjustment of the ring 26 upon ring 25, there is shown a clamp 33 rendered operative by set screw 34, which clamp is mounted upon a screw 35 screw-threaded in a post 36 carried by the ring 25.

If the set screw 34 is loosened the ring 26 and the star map 27 may be adjusted to bring the projection of the star into rough registry with their showing upon the star map, the angle of the instrument 19 being simultaneously adjusted. The set screw 34 being tightened, a fine adjustment may be had by operation of the screw 35.

Obviously vernier scales will be provided for the most accurate possible reading of the angles.

It will be seen that supposing the instrument to be mounted upon a plane with the clock keeping Greenwich time, if the plane flies at a high speed and for instance in the stratosphere for a number of hours, it will be impossible by any of the usual dead reckoning means, to determine location, as the speed will depend upon air drift, speed of the plane through the air, and other variables making dead reckoning impossible. However by keeping the plane in level flight as much as possible supplemented by the gimbal mounting of the instrument, if the projection instrument be adjusted to cause the polar star images to coincide with the star map accurately, both latitude and longitude can be immediately read upon the scales at 29 and 37, the latter scale being a division of the periphery of the ring 25 into 360 degrees, minutes, and as close approximation to seconds as is possible considering the circumference of the ring. This reading, since a degree of longitude at the equator is about 70 miles and the minute is about 1.1 miles, if the scale can be read within one or two seconds of accuracy, a navigator should be able to determine his location with an error of not much more than one mile.

Use of the instrument in the stratosphere is referred to where it may be possible to utilize the instrument at all times of day or night. The projection instrument 19 should be of as great light-gathering power as possible.

The ring 38 in which the ring 10 is mounted is shown as freely revoluble in a frame 39 and the ring 38 may carry compass bearing indications not shown, to coact with a zero point 40 carried upon the frame 39. Therefore when the projection instrument 19 is adjusted to bring the star images into registry with the map the direction of flight of the plane may also be read directly from the instrument.

To hold the gimbal rings level, counter weights are shown at 41, 42 carried upon arms rigid with the rings 10 and 13 respectively.

The star maps must obviously be properly located in ring 26 to be circumferentially correct for 0° longitude time. To this end a projection 43 is shown carried by the star map disk 27 entering a properly located recess in the rim of ring 26.

The angle read at scale 29 is slightly influenced by the altitude of the plane, when the instrument is so used. While this variation is very small because of the distance of the stars, yet, if desired a scale indicated roughly at 45 may be provided to be adjusted relative to a zero point 44 on the shaft, providing an adjustment by use of set screw 30' for differences of say ten or twenty thousand feet differences of altitude.

For convenience when crossing the Equator, the clock casing can be made two faced in a known manner with a star map for the Northern Hemisphere mounted at one face and a second map for stars visible about the southern polar axis carried and properly rotated at the opposite face. The two faced casing may be mounted in arms 20, 21 for ready reversal, by means not shown.

Minor changes may be made in the physical embodiment of the invention within the scope of the appended claims without departing from the spirit of the invention.

I claim:

1. A navigation instrument comprising, in combination: clock mechanism keeping 0° longitude time; a revoluble star map showing circumpolar stars and revolved by said mechanism; mechanical means to provide an accurate comparison between the position of revolution of said star map with the position of the stars in their apparent revolution about the polar axis of the heavens; said last named means carrying a scale calibrated in degrees and fractions thereof to indicate longitude.

2. A navigation instrument comprising, in combination: clock mechanism; means actuated thereby to revolve in synchronism with sidereal time at 0° longitude; an astronomical chart showing at least a plurality of circumpolar stars; means for causing revolution of said chart with said first named means releasable for free revolution of adjustment; means for projecting images of the stars shown on said chart for comparison with the chart to provide a basis for angular adjustment of the chart; and a scale of degrees and fractions of degrees of longitude measuring the angular displacement of the chart when revolved into the position occupied by the projected images of the stars to show the longitude of location of the instrument.

3. A navigation instrument comprising, in combination: a casing for sidereal time keeping mechanism to be operated at 0° longitude time; a star map disk mounted on said casing for free revolution of adjustment; means for clamping said star map disk having its center point a polar location, to be driven by said mechanism; a star image projection instrument mounted for angular adjustment about a horizontal axis; means holding said casing and map with said polar location fixed with the axis of said instrument; means for reading said angular adjustment in terms of degrees and fractions thereof of latitude; means for indicating the revolved adjustment of said map when in registry with the star images provided by said instrument, relative to 0° longitude in terms of degrees and fractions thereof of longitude; means for rotatably adjusting said horizontal axis in a plane parallel with the surface of the earth to bring the angular movement of the instrument about said horizontal axis into the plane of a great circle of the earth passing through the poles; whereby to determine latitude and longitude by direct reading.

4. A navigation instrument comprising, in combination: a star map; 0° longitude, sidereal time keeping means connected to cause revolution of said map about a polar axis thereof; means to adjust said map about said polar axis to a position corresponding to the position in the heavens of the stars shown on said map; and means to indicate longitude in degrees and fractions thereof determined by the circumferential relation of the adjusted star map and the time indicated by the time keeping means as of 0° longitude.

5. A navigation instrument comprising, in combination: a revoluble support; means to preserve a level position thereof; standard means rising from said support; a shaft revolubly mounted on said standard means; a casing for clock mechanism rigidly supported by said shaft in spaced relation thereto; a star map carried by said casing to be rotated by the mechanism about a polar axis of the map; a star image projecting optical system rigid with said shaft with its axis coincident with the polar axis of said map.

6. The combination of claim 5 with a scale indicating degrees and fractions thereof of latitude carried by said standard means and a pointer moving with said shaft.

7. The combination of claim 5 with said map adjustable circumferentially relative to said casing and with indicating means carried by the respectively adjustable parts denoting degrees and fractions thereof of longitude when the star map is in registry with projected images of the stars.

TONY BROCKY.